(12) United States Patent
Zhao et al.

(10) Patent No.: US 9,755,696 B2
(45) Date of Patent: Sep. 5, 2017

(54) METHOD, BASED ON COMPOSITE MODULATION, OF DATA TRANSMISSION BETWEEN POWER ELECTRONIC DEVICES WITHOUT COMMUNICATION LINE

(71) Applicant: SOUTHEAST UNIVERSITY, Jiangsu (CN)

(72) Inventors: Jianfeng Zhao, Jiangsu (CN); Zhendong Ji, Jiangsu (CN); Wei Liu, Jiangsu (CN); Yichao Sun, Jiangsu (CN)

(73) Assignee: SOUTHEAST UNIVERSITY (CN)

( * ) Notice: Subject to any disclaimer, the term of this patent is extended or adjusted under 35 U.S.C. 154(b) by 0 days.

(21) Appl. No.: 15/310,389

(22) PCT Filed: Jul. 15, 2014

(86) PCT No.: PCT/CN2014/082184
§ 371 (c)(1),
(2) Date: Nov. 10, 2016

(87) PCT Pub. No.: WO2015/172430
PCT Pub. Date: Nov. 19, 2015

(65) Prior Publication Data
US 2017/0149473 A1    May 25, 2017

(30) Foreign Application Priority Data
May 12, 2014 (CN) .......................... 2014 1 0195483

(51) Int. Cl.
*H04B 3/54* (2006.01)
*H04L 27/12* (2006.01)
*H04L 25/49* (2006.01)
(52) U.S. Cl.
CPC ........... *H04B 3/54* (2013.01); *H04L 25/4902* (2013.01); *H04L 27/12* (2013.01)

(58) Field of Classification Search
CPC .................................. H04B 3/54; H04L 27/12
See application file for complete search history.

(56) References Cited

U.S. PATENT DOCUMENTS

| 2004/0162117 A1* | 8/2004 | Liebenow ................. G06F 1/26 455/572 |
| 2012/0049655 A1* | 3/2012 | Leyendecker ........... H04B 3/54 307/131 |

(Continued)

FOREIGN PATENT DOCUMENTS

| CN | 102487299 | 6/2012 | ............. H04B 17/00 |
| CN | 102946259 | 2/2013 | ............... H04B 3/54 |

(Continued)

OTHER PUBLICATIONS

International Search Report (w/translation) and Written Opinion (w/o translation) issued in application No. PCT/CN2014/082184, dated Jan. 28, 2015 (9 pgs).

*Primary Examiner* — Freshteh N Aghdam
(74) *Attorney, Agent, or Firm* — Hayes Soloway P.C.

(57) ABSTRACT

A method of data transmission between power electronic devices without a communication line involves generation of a digital signal in a data transmission process. The digital signal enables PWM modulation of specific data information via a composite modulation method. The composite modulation superimposes PWM modulation waves after modulating the PWM carrier frequency or conducting high-frequency modulation on the data. The composite modulation generates a PWM drive pulse signal which is transmitted to a power circuit via a main power electronic circuit to complete the data transmission process. In the data receiving process, signals are extracted on the voltage and current of a power line via software or hardware, and data demodulated to obtain the data information to complete the data receiving process.

5 Claims, 2 Drawing Sheets

(56) References Cited

U.S. PATENT DOCUMENTS

| | | | | |
|---|---|---|---|---|
| 2012/0128081 A1* | 5/2012 | Hikihara | ................ | H04B 3/54 |
| | | | | 375/257 |
| 2013/0182781 A1* | 7/2013 | Matsutani | .............. | H04B 3/548 |
| | | | | 375/257 |
| 2017/0094433 A1* | 3/2017 | McCarty | ............... | H04R 27/00 |

FOREIGN PATENT DOCUMENTS

| | | | | |
|---|---|---|---|---|
| CN | 103532592 | 1/2014 | .............. | H04B 3/54 |
| JP | 2006203481 | 8/2006 | .............. | H04B 3/54 |

\* cited by examiner

METHOD, BASED ON COMPOSITE MODULATION, OF DATA TRANSMISSION BETWEEN POWER ELECTRONIC DEVICES WITHOUT COMMUNICATION LINE

FIELD OF THE INVENTION

The present invention relates to the technical field of power electronics and data transmission through power lines, in particular to a method based on composite modulation of data transmission between power electronic devices without communication line, which is a method that utilizes power electronic devices to realize power transmission and data transmission through a power line at the same time.

BACKGROUND OF THE INVENTION

As a network with the largest coverage at present, the power line network has a huge potential utilization value; in addition, owing to the fact that the power network requires data transmission functions such as controlling signal transmission and dispatching automation data transmission, etc., power network communication techniques take an important role. As the electric power industry is developed and the informatization level of the electric power is improved continuously, there is an increasingly obvious trend of interpenetration between power network and power information network. Utilizing existing power transmission lines to implement data communication not only involves a very low cost, but also is simple in network construction and maintenance.

Early in the 1920s, data transmission through power lines began to draw people's attention. Later, this technology was developed quickly, along the continuous development and maturing of power line communication techniques, this technology has been widely applied in different power line networks, including high-voltage, medium-voltage, and low-voltage power line networks, etc. For example, power carrier communication technique utilizes power lines for data transmission. However, conventional power line communication techniques require special devices to manipulate data signals, including modulation, filtering, and demodulation, etc, these special devices not only cause increased cost, but also bring failure risks.

Since high-power semiconductor switching devices were developed, power electronic techniques have been developed and improved rapidly, and power electronic convertor circuits have been widely applied in electric power systems increasingly. Especially, since the 1980s, as semiconductor device manufacturing techniques were developed, the power processing capacities and switching speeds of switching devices have been improved remarkably, and power electronic devices have been applied more and more widely, almost involving all electric power application domains, ranging from electric power generation, electric power storage, electric power transmission, to electric power utilization. Power electronic devices applied in a power network are connected with power lines, and are mainly used to implement power transmission control. Utilizing power electronic devices to implement power transmission and data transmission through power lines at the same time not only can eliminate the demand for special communication devices and thereby save the cost, but also has wide application prospects under the situation of rapid development of power electronics power control techniques in power networks.

Contents of the Invention

To overcome the defects and drawbacks in data transmission and communication through power lines with power electronic device in the prior art, the present invention puts forward a method based on composite modulation of data transmission between power electronic devices without communication line, which, in the data transmission process, utilizes a composite modulation method to include specific data information in a PWM modulation process and then transmits the data information to a power line through a main power electronic circuit by means of driving pulse signals, so as to accomplish the data transmission process; extract signals of the voltage and current in the power line in the data receiving process, and then obtain the data information through data demodulation, so as to accomplish the data receiving process. Thus, power transmission and data transmission through the power lines are accomplished at the same time utilizing power electronic devices.

The present invention provides a method based on composite modulation of data transmission between power electronic devices without communication line, which includes the following features:

1. The method according to the present invention is based on power electronic devices; a main circuit of the power electronic devices may be connected in series or in shunt with a power line. The present invention is generally implemented as follows: utilizing a composite modulation method to include specific data information in a PWM modulation process in the data transmitting process, and then transmitting the specific data information to the power line through a main power electronic circuit by means of driving pulse signals, so as to accomplish a data transmission process; extracting the signals of the voltage and current in the power line in the data receiving process, and then obtaining the data information through data demodulation, so as to accomplish a data receiving process;

2. The following control scheme is used in the data transmission process:
   1) a controller of the power electronic device includes a communication processing module, which is configured to receive, transmit, process, and judge communication signals transmitted through the power line, etc.; the communication processing module generates data signals when data needs to be transmitted;
   2) the controller of the power electronic device employs a PWM modulation mode to control the main power electronic circuit, and the controller contains a main control algorithm, which generates a raw modulation wave according to the voltage and current in the power network and control commands;
   3) the data signals generated by the communication processing module and the raw modulation wave generated by the main control algorithm are fed into a composite modulation module to accomplish composite modulation; the composite modulation may be carried out in two approaches: the first approach is to process the data signals by frequency shift keying (FSK) to generate a carrier wave with varying frequencies, and then compare the carrier wave with the raw modulation wave to form drive pulses; the second approach is to modulate the data signals into a high-frequency modulation wave, and superpose the high-frequency modulation wave on the raw modulation wave to form a new modulation wave, and then compare the new modulation wave with a carrier wave with fixed frequency to form drive pulses; the drive pulses drive the main power electronic circuit to accomplish transmission of communication data.

3. The following control scheme is used in the data receiving process:
   1) the voltage and current on line side are acquired, and the communication data information contained in the voltage and current is extracted by a software or a hardware;
   2) the data information is demodulated to obtain demodulated communication data, and then the data is fed into the communication processing module, so as to accomplish receiving of the communication data.

Compared with the prior art, the present invention has the following beneficial effects:
   (1) Power and data can be transmitted through a power line at the same time, and both of them are implemented by means of power electronic devices;
   (2) It is unnecessary to construct a data communication network or use special data transceiving devices; instead, the existing resources can be utilized; thus, the cost is reduced, and the network construction cost and maintenance cost are low;
   (3) Power electronic devices are used more and more widely in power networks; the present invention meets and utilizes that developing trend of electric power systems in the future;
   (4) The data communication processing functions can be implemented with core control hardware and software resources of power electronic devices (e.g., ARM, DSP, etc.); thus, the resources are fully utilized.

DETAILED DESCRIPTION OF THE EMBODIMENTS

Hereunder the method based on composite modulation of data transmission between power electronic devices without communication line according to the present invention will be detailed with reference to the accompanying drawings.

The method according to the present invention is based on power electronic devices; a main circuit of the power electronic devices may be connected with a power line in series or in shunt. A PWM modulation method is used for the control.

Figure 1:
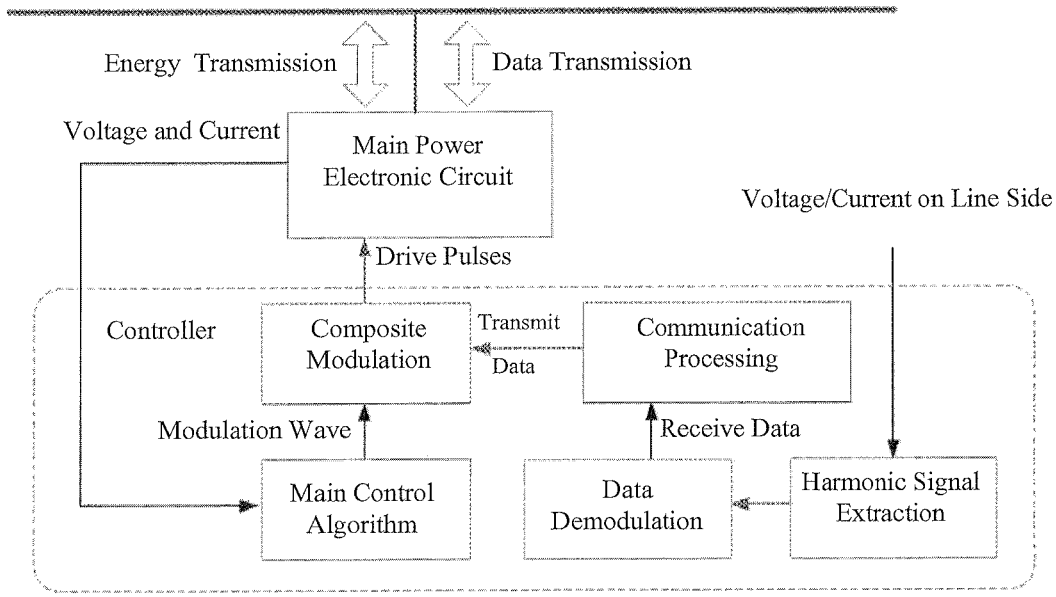
FIG. 1 is a block diagram of the method based on composite modulation of data transmission between power electronic devices without communication line.

As shown in FIG. 1, the control modules of a power electronic device comprise a main control algorithm module, a signal extraction module, a data demodulation module, a communication processing module, and a composite modulation module, wherein, the main control algorithm module is configured to control the output voltage or current of the power electronic device to generate a raw modulation wave; the signal extraction module is configured to extract a harmonic wave that contains data information frequency by a software or hardware; the input of the signal extraction module is the voltage and current on line side measured by sensors; the data demodulation module is configured to demodulate the information contained in the harmonic wave extracted by the signal extraction module to obtain communication data, and then send the communication data to the communication processing module; the communication processing module is configured to process the received data information, send control commands to the main control algorithm module, and transmit the data information in real time; the composite modulation module is configured to carry out composite modulation of the communication data transmitted from the communication processing module and the modulation wave generated by the main control algorithm module to form drive pulses. As shown in FIG. 1, the method according to the present invention is generally implemented as follows: in the data transmitting process, transmitting data via the communication processing module, utilizing a composite modulation method to include specific data information in a PWM modulation process, and then transmitting the specific data information to the power line through a main power electronic circuit by means of driving pulse signals, so as to accomplish a data transmission process; in the data receiving process, extracting signals from the voltage and current in the power line, and then obtaining the data information through data demodulation, so as to accomplish a data receiving process.

Figure 2:
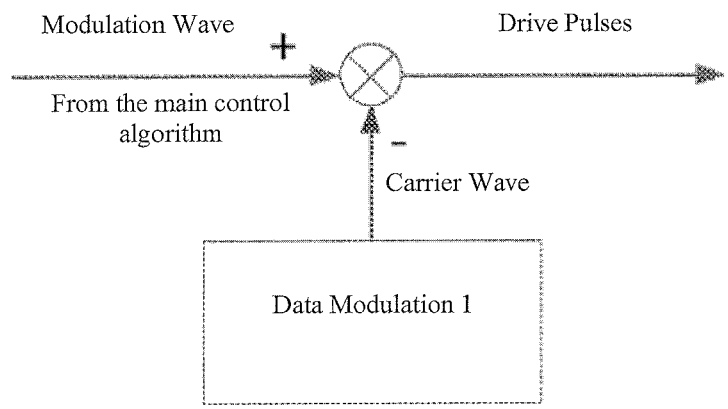
FIG. 2 is a schematic diagram of the first composite modulation approach.
Figure 3:
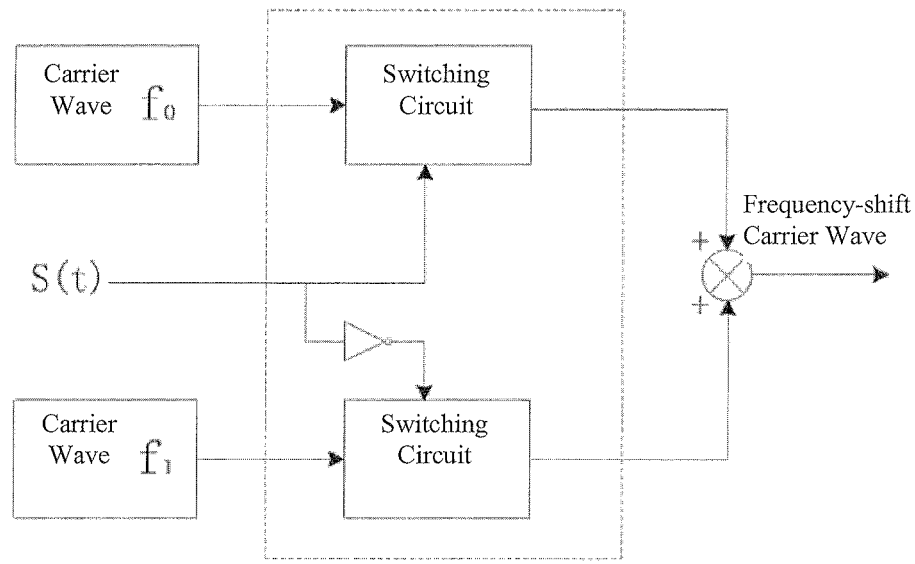
FIG. 3 is a block diagram of the frequency shift carrier wave generation method.
Figure 4:
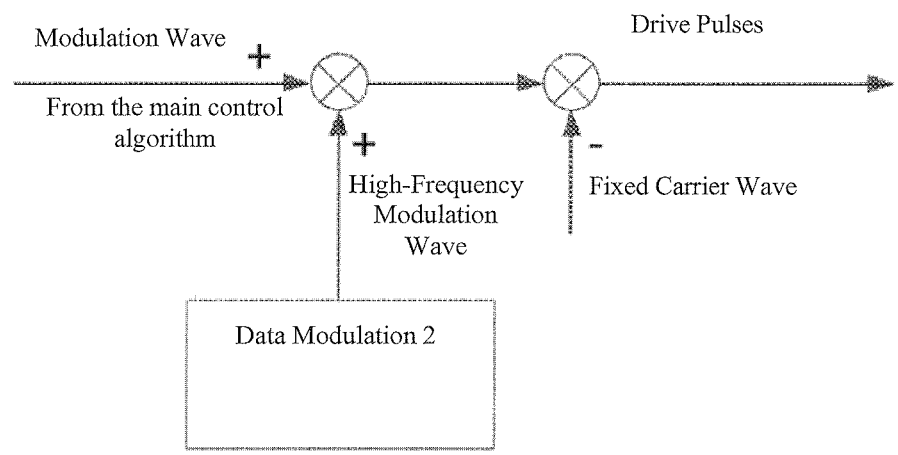
FIG. 4 is a schematic diagram of the second composite modulation approach.

The method employs the following control scheme in the data transmission process:
   1) when information needs to be transmitted in the working process of communication processing module, the communication processing module carries out digital encoding on the information in a specific format to form digital signals that contain communication information, wherein, the digital signals are in the form of data frames, each of which comprises a frame header, a synchronization string, information data, and a frame end;
   2) the main control algorithm module of the power electronic device generates a raw modulation wave according to the voltage and current in the power network and control commands; the main control algorithm may employ the modes of open-loop control, closed-loop control, or dual-closed-loop control, etc.;
   3) the digital signals generated by the communication processing module and the raw modulation wave generated by the main control algorithm are sent into the composite modulation module to accomplish composite modulation; the composite modulation may be carried out in two approaches: as shown in FIG. 2, the first composite modulation approach is to process the digital signals generated by the communication processing module by frequency-shift keying (FSK) to generate a carrier wave that contains communication information, and then compare the carrier wave with the raw modulation wave to form drive pulses; the frequency-shift carrier wave is generated with the method shown in FIG. 3, wherein, an input selection circuit for the signals S(t) to be transmitted is used, to control the On/Off of the two carrier waves f0 and f1. As shown in FIG. 4, the second composite modulation approach is to modulate the digital signals generated by the communication processing module into a high-frequency modulation wave, superpose the high-frequency modulation wave on the raw modulation wave to form a new modulation wave, and compare the new modulation wave with a carrier wave with a fixed frequency to form drive pulses. The drive pulses generated in either one of the two composite modulation approaches drives the main power electronic circuit to accomplish the transmission of the communication data.

The method employs the following control scheme in the data receiving process:

1) the voltage and current on line side are acquired, and the communication data information contained in the voltage and current is extracted by a software or a hardware;
2) the extracted data information is demodulated to obtain demodulated communication data, and then the data is fed into the communication processing module, so as to accomplish receiving of the communication data. In the demodulation process, a phase locked loop circuit for phase recovery is used to ensure the transmitted signals and the received signals have the same frequency and phase.

The invention claimed is:

1. A method based on composite modulation of data transmission between power electronic devices without communication line, comprising: in a data transmitting process, utilizing a composite modulation method to include specific data information in a pulse width modulation (PWM) process, and then transmitting the specific data information to a power line through a main power electronic circuit by means of driving pulse signals, so as to accomplish the data transmission process; in a data receiving process, extracting signals from voltage and current in the power line, and then obtaining data information through data demodulation, so as to accomplish the data receiving process, wherein, a control module of the power electronic device comprises a main control algorithm module, a signal extraction module, a data demodulation module, a communication processing module, and a composite modulation module, and wherein, the following control scheme is used in the data transmission process:

1) the communication processing module is configured to receive, transmit, process, and judge communication signals transmitted through the power line, and the communication processing module generates data signals when data needs to be transmitted;
2) the main control algorithm module of the power electronic device employs a pulse width modulation (PWM) mode to control the main power electronic circuit, and the controller contains a main control algorithm, which generates a raw modulation wave according to the voltage and current in the power line and control commands;
3) the data signals generated by the communication processing module and the raw modulation wave generated by the main control algorithm are fed into a composite modulation module to accomplish composite modulation.

2. The method based on composite modulation of data transmission between power electronic devices without communication line according to claim 1, wherein, the main circuit of the power electronic devices is connected with the power line in series or in shunt.

3. The method based on composite modulation of data transmission between power electronic devices without communication line according to claim 1, wherein, the composite modulation is carried out as follows: the data signals are processed by frequency shift keying (FSK) to generate a carrier wave that has varying frequencies, and then the carrier wave is compared with the raw modulation wave to generate the driving pulse signals.

4. The method based on composite modulation of data transmission between power electronic devices without communication line according to claim 1, wherein, the composite modulation is carried out as follows: the data signals are modulated into a high-frequency modulation wave, and are superposed on the raw modulation wave to form a new modulation wave, and then the new modulation wave is compared with the carrier wave with a fixed frequency to form the driving pulse signals; the driving pulse signals drive the main power electronic circuit to accomplish the data transmitting process.

5. The method based on composite modulation of data transmission between power electronic devices without communication line according to claim 1, wherein, the following control scheme is used in the data receiving process:

1) the voltage and the current on line side are acquired, and the communication data information contained in the voltage and current are extracted;
2) the data information is demodulated to obtain demodulated communication data, and then the demodulated data is sent into the communication processing module, so as to accomplish receiving of the communication data.

* * * * *